June 24, 1930.  S. W. VOLLINK  1,765,468
TRANSPLANTING MACHINE
Filed Feb. 27, 1928   3 Sheets-Sheet 1
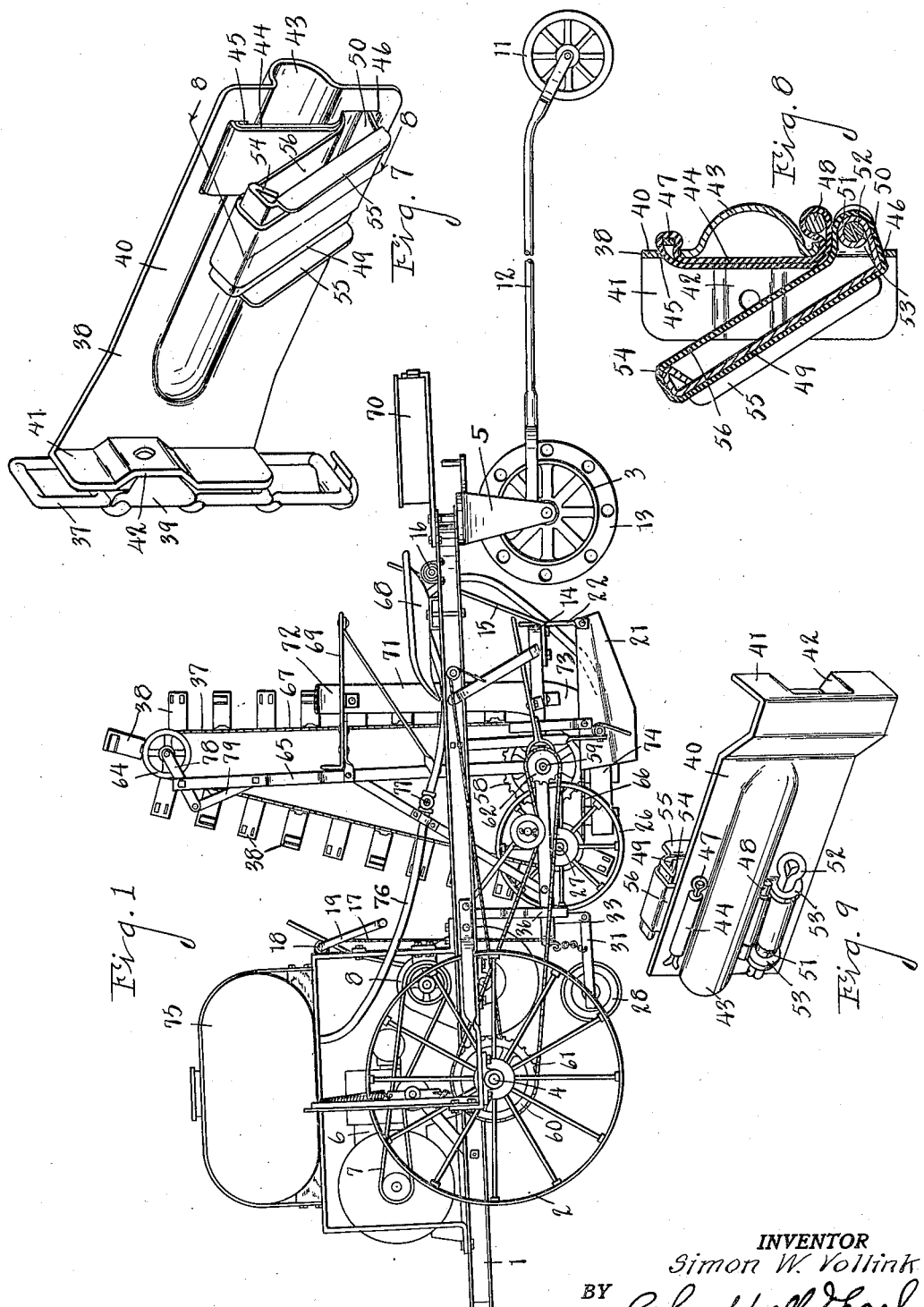
INVENTOR
Simon W. Vollink
BY Chappell Earl
ATTORNEYS June 24, 1930.   S. W. VOLLINK   1,765,468
TRANSPLANTING MACHINE
Filed Feb. 27, 1928   3 Sheets-Sheet 2
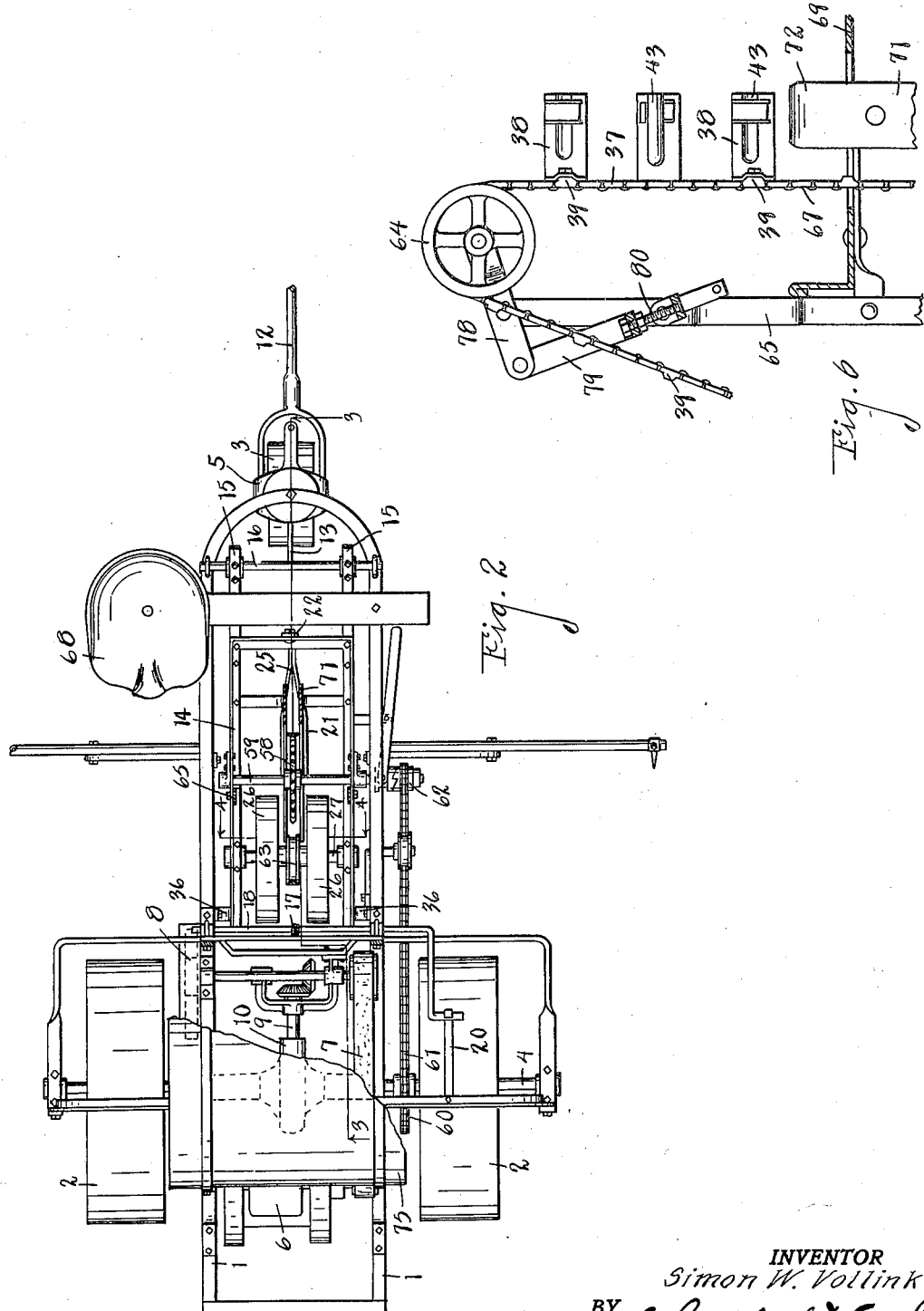
INVENTOR
Simon W. Vollink
BY Chappell & Earl
ATTORNEYS June 24, 1930.  S. W. VOLLINK  1,765,468
TRANSPLANTING MACHINE
Filed Feb. 27, 1928   3 Sheets-Sheet 3
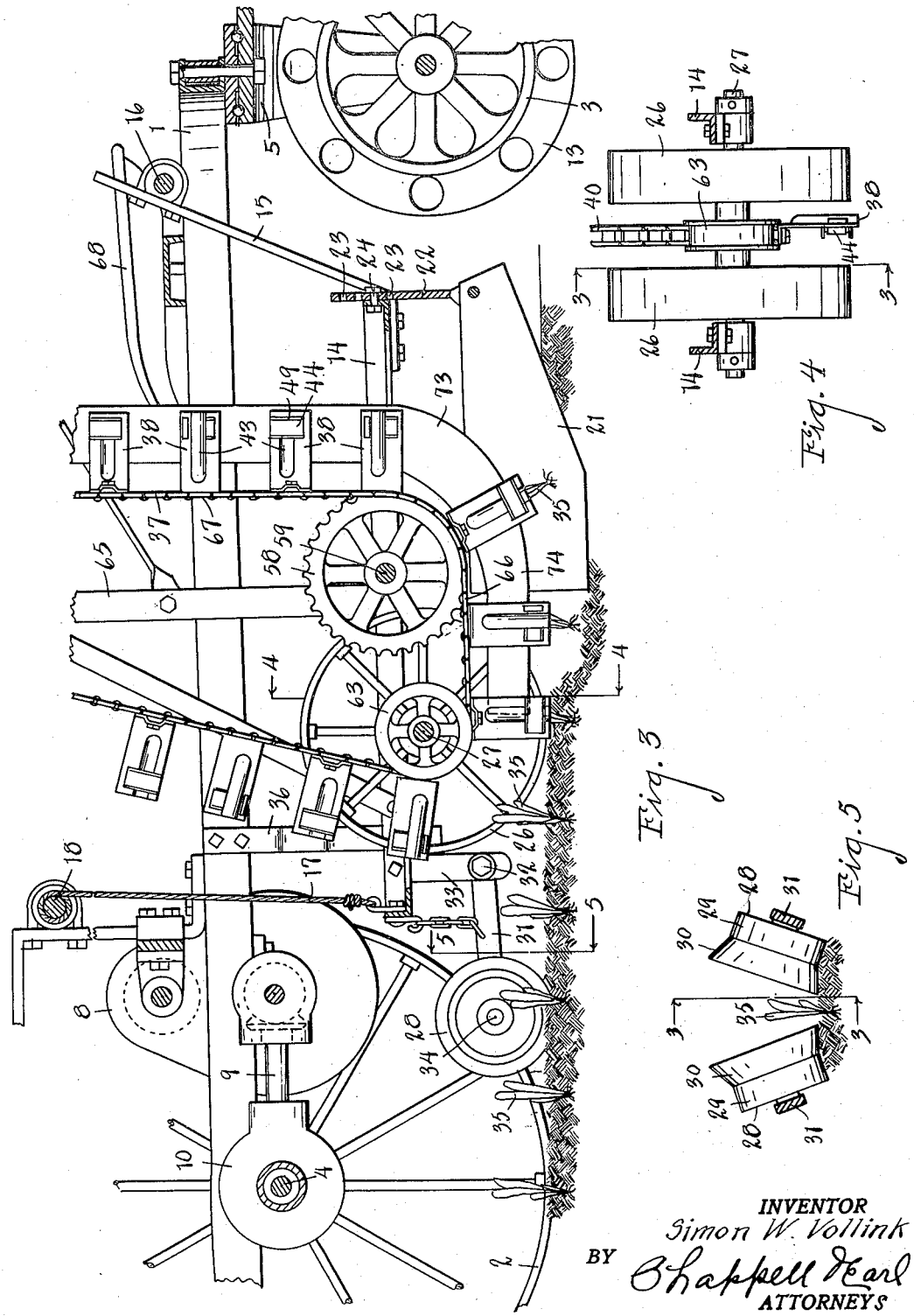
INVENTOR
Simon W. Vollink
BY Chappell Earl
ATTORNEYS Patented June 24, 1930

1,765,468

UNITED STATES PATENT OFFICE

SIMON W. VOLLINK, OF NASHVILLE, MICHIGAN

TRANSPLANTING MACHINE

Application filed February 27, 1928. Serial No. 257,382.

The main objects of this invention are:

First, to provide a transplanting machine adapted for the transplanting of relatively small and delicate plants such as celery, beets, cabbage, tomato plants and the like.

Second, to provide a transplanting machine of the character described which is adapted for the setting of such delicate plants on a large scale without injury thereto.

Third, to provide a machine of this character in which the plants are effectively set in the ground and the ground left in a condition calculated to promote the growth of the plants.

Fourth, to provide a machine of this class which is of very large capacity and may be operated with a minimum of labor on the part of the operator.

Objects pertaining to details and economies of my invention will definitely appear from the description to follow. The invention is defined in the claims.

A structure embodying the features of my invention is clearly illustrated in the accompanying drawing, in which:

Fig. 1 is a side elevation of a machine embodying the features of my invention, a portion of the steering pole being broken away.

Fig. 2 is a fragmentary plan view.

Fig. 3 is a detail view mainly in vertical section on line 3—3 of Figs. 2, 4 and 5.

Fig. 4 is a detail view partially in vertical transverse section on line 4—4 of Figs. 2 and 3.

Fig. 5 is a detail section on line 5—5 of Fig. 3.

Fig. 6 is a detail vertical section on a line corresponding to that of the section of Fig. 3 showing details of the upper portion of the conveyor.

Fig. 7 is an enlarged perspective view of one of the holders.

Fig. 8 is a detail section on line 8—8 of Fig. 7.

Fig. 9 is a rear perspective view of a modification of one of the holders, the body portion being offset for central alinement on the chain.

Referring to the drawing, I provide a main carrying or running gear frame designated generally by the numeral 1. This frame is designed to support the operating parts and is provided with rear carrying and driving wheels 2 and a front carrying and steering wheel 3. The wheels 2 are mounted on a driven axle 4 while the wheel 3 is disposed centrally and mounted on a caster designated generally by the numeral 5.

The machine illustrated is a self-propelled machine, an internal combustion engine 6 being provided for driving the machine and also the operating mechanism. The engine is connected by the belt 7 and suitable coacting pulleys with a variable speed transmission designated generally by the numeral 8. This transmission is connected by the shaft 9 to a differential conventionally indicated at 10 on the axle 4. The details of these parts are not illustrated.

The vehicle is self-steered, a steering wheel 11 being provided which is adapted to travel in a furrow-like mark provided therefor. This steering wheel is mounted on the forward end of the steering pole 12 which is connected at its rear end to the caster standard of the steering wheel 3. The steering wheel 3 is of substantial width and is provided with a peripheral flange 13 constituting a furrow forming member, this flange also serving to steady the front end of the machine preventing lateral swaying or sliding thereof. In practice means are also provided for steering manually, but as such means form no part of my present invention they are not shown herein.

I provide a sub-frame designated generally by the numeral 14 which is supported at its front end from the main frame by means of the draw bars 15 which are mounted on the cross rod 16, thus providing a pivotal connection permitting vertical movement of the sub-frame. The sub-frame is supported at its rear end by means of the cable 17, adapted to be wound on the shaft 18 on the main frame. The shaft is provided with a crank 19 and an arm 20 is mounted to engage this crank.

When the machine is traveling on the highway it is inoperative. It also may be adjusted to limit the downward movement of the sub-frame in the event the soil is very soft.

At the front end of the sub-frame I mount a furrow opener 21 supported on a hanger 22 having a plurality of holes 23 therein with which the bolt 24 may be engaged to adjustably support the furrow opener. The furrow opener is alined with the steering wheel so that it follows in the initial furrow formed by the flange 13 of the steering wheel. The furrow opener has rearwardly diverging wings 25.

At the rear of the furrow opener I mount a pair of furrow closing wheels 26 carried by an axle 27 on the sub-frame. The wheels in addition to forming furrow closing means also serve as carrying wheels for the sub-frame, controlling or gaging the depth of planting.

At the rear of the furrow closing wheels I mount a pair of press wheels 28 having cylindrical outer portions 29 and outwardly tapered conical portions 30. These press wheels are carried by bars 31 pivotally mounted at 32 on hangers 33 depending from the sub-frame so that the press wheels may swing or oscillate up and down.

The journals 34 of these press wheels are disposed in an outwardly inclined relation so that the press wheels engage the earth substantially as shown in Fig. 5, the periphery of the press wheels at the point of engagement with the earth being substantially horizontal. The cylindrical portion is inclined inwardly so that the earth is pressed inwardly and downwardly without crowding or displacing the roots of the plant which are indicated at 35.

The sub-frame is supported against lateral sway by the depending guides 36 on the main frame. The plants are delivered to position by means of a conveyor consisting of a chain 37 carrying a plurality of holders designated generally by the numeral 38. These holders are mounted in spaced relation on the chain as may be desired, according to the spacing of plants required. The holders are carried by base members 39 which are designed to replace one of the regular links of the chain so that a different set-up or spacing is easily had.

The holders comprise body members 40 formed of sheet metal stampings and having laterally disposed flanges 41 at their inner ends recessed or struck up at 42 to receive the base members 39. The ends of these flanges overlap the adjacent links so that when the chain is very taut the holders are supported substantially at right angles thereto.

The body members 40 have longitudinal channels 43 therein opening at the outer end of the holders. Elastic gripping members 44 are disposed across the channels adjacent their outer ends. These gripping members are conveniently formed of elastic bands of proper width, the ends of which are disposed through holes 45 and 46 formed in the body members 40 at opposite sides of the channel. Pins 47 and 48 are arranged through the bights of the bands, thereby retaining the same in position.

The holders are provided with pivoted jaws 49, also preferably formed as sheet metal stampings, and having rearwardly projecting flanges 50 at their inner ends disposed through the openings 46 and terminating in knuckles 51 engaged by the pivots 52, which are carried by ears 53 on the rear side of the body members of the holders.

At their outer ends the holders are provided with inturned flanges 54, and along their side edges with out-turned flanges 55. Resilient or elastic grippers 56 in the form of elastic bands are arranged around the jaws and, owing to their being arranged over the flanges, are supported from the flanges, providing elastic gripping faces. These bands engage the inner edges of the holes 46 so that the gripper members act as springs for holding the jaws normally in open position. This provides means of effectively holding the plants without injury thereto, even such delicate seedlings as beets and the like.

The conveyor is driven so that as the holders are carried along the operators place the plants within the jaws, which are automatically closed thereon and carried by the holders to the point of delivery. In the embodiment illustrated the driving and supporting means consists of a driving sprocket 58 which is mounted on a shaft 59 on the sub-frame and connected to a sprocket 60 on the axle by means of the driving chain 61 and the sprocket 62 on the shaft 59.

This driving sprocket 58 is supported so that, as the holders are carried around the same, they swing between the wings of the furrow opener as is most clearly shown in Fig. 3.

A guiding pulley 63 is mounted on the axle 27 of the furrow closing wheels 26 and is disposed centrally between these wheels. A second supporting pulley 64 is provided for the conveyor, this pulley being supported in an elevated position by the standards 65. With the parts thus arranged the conveyor is supported so as to provide a horizontal reach 66 substantially parallel with the surface over which the machine is traveling, and a vertical reach 67.

The machine illustrated is designed for two operators and two seats 68 are provided, facing rearwardly and facing the tables 69 on which the plants to be transplanted are laid. A carrying box 70 is mounted on the front of the main frame.

Means for closing the holders and retaining them in closed position are provided, consisting of a pair of spaced jaw closing and retaining members 71 which have outwardly flared upper ends 72 projecting slightly above the tables 69. The operator lays the plants, top inward, between the resilient grippers 44 and 56, retaining his grasp on the same until the holders are carried between the closing members, which closes the jaws 49, the flanges 55 thereof engaging one of the closing members and receiving the wear.

These closing members are angled, their angles 73 being disposed between the wings of the furrow openers and their horizontal portions 74 extending rearwardly therefrom to a point adjacent to but preferably in front of the vertical plane of the furrow closing wheel axle 27 so that the jaws are permitted to open at the point where the soil is pressed around the roots of the plants. The conveyor is timed, however, to the same speed as the travel of the machine over the surface of the ground so that there is no distortion or tilting of the plants and no pull thereon after the roots have been engaged by the soil.

The plants are set at uniform depth owing to the furrow closing wheels supporting the sub-frame and traveling on the surface of the ground. The press wheels are designed to compact and level the soil; and the peculiar shape described prevents ridging, at the same time firmly pressing the soil about the roots of the plant.

Water is supplied from a tank 75 which, for convenience, is mounted above the engine. A flexible conduit 76 is carried forwardly from the tank and has its lower end disposed between the wings of the furrow opener so as to deliver the water in the most effective position. A valve 77 is provided to control the delivery of the water.

Suitable tension is maintained on the conveyor chain by mounting the pulley 64 on a pivoted arm 78 which is adjustably supported by means of a link 79 and screw 80, see Fig. 6.

While I have illustrated my improvements as I have embodied the same for transplanting, the machine is very desirable for use in planting roots, bulbs or tubers, or plants in which sections thereof are used in propagation. No modification is required for planting peppermint, for instance, but I prefer to modify the holders when the machine is used for bulbs or tubers.

My improved transplanting machine is of large capacity, is highly efficient in that the plants are handled without injury thereto and set in a desirable and uniform manner, and is adapted for a great variety of plants. I have not attempted to illustrate or describe certain embodiments and adaptations which I contemplate as I believe the disclosure made will enable those skilled in the art to embody or adapt the same as may be desired.

Having thus described my invention what I claim as new and desire to secure by Letters Patent is:

1. In a machine of the class described, the combination of a main carrying frame provided with a centrally disposed caster steering wheel, said steering wheel having a peripheral flange constituting a furrowing member, a sub-frame pivotally mounted at its forward end on said main frame, guide members on said main frame coacting with the rear end of said sub-frame to support it laterally while permitting vertical movement thereof, adjustable means for limiting the downward movement of the rear end of said sub-frame, a furrow opener provided with spaced wings adjustably mounted at its forward end on said sub-frame to follow in the path of said steering wheel furrowing member, furrow closing and sub-frame carrying wheels provided with an axle disposed on said sub-frame at the rear of the furrow opener, a conveyor provided with a plurality of normally open holders, supporting and driving means therefor comprising a driving sprocket mounted on said sub-frame above the wings of said furrow opener, a pulley on said axle and a second pulley mounted in an elevated position above said main frame, whereby said conveyor has a horizontal reach substantially parallel with the surface of the ground and alined with said furrow opener and a substantially vertical downward reach, and a pair of spaced angled holder closing members disposed at the sides of the path of the holders with their angled portions between the wings of said furrow opener, their vertical portions extending upwardly above said main frame, and their horizontal portions terminating adjacent to but in advance of the vertical plane of said furrow closing wheel axle.

2. In a machine of the class described, the combination of a main carrying frame provided with a centrally disposed caster steering wheel, said steering wheel having a peripheral flange constituting a furrowing member, a sub-frame pivotally mounted at its forward end on said main frame, a furrow opener provided with spaced wings mounted at its forward end on said sub-frame to follow in the path of said steering wheel furrowing member, furrow closing and sub-frame carrying wheels provided with an axle disposed on said sub-frame at the rear of the furrow opener, a conveyor provided with a plurality of normally open holders, supporting and driving means therefor comprising a driving sprocket mounted on said sub-frame above the wings of said furrow opener, a pulley on said axle and a second pulley mounted in an elevated position above said main frame, whereby said conveyor has a horizontal reach substantially parallel with the surface of the ground and alined with said furrow opener and a substantially vertical downward reach, and a pair of spaced angled holder closing members disposed at the sides of the path of the holders with their angled portions between the wings of said furrow opener, their vertical portions extending upwardly above said main frame, and their horizontal portions terminating adjacent to but in advance of the vertical plane of said furrow closing wheel axle.

3. In a machine of the class described, the combination of a main carrying frame provided with a centrally disposed caster steering wheel, said steering wheel having a peripheral flange constituting a furrowing member, a sub-frame pivotally mounted at its forward end on said main frame, a furrow opener provided with spaced wings mounted at its forward end on said sub-frame to follow in the path of said steering wheel furrowing member, furrow closing and sub-frame carrying wheels provided with an axle disposed on said sub-frame at the rear of the furrow opener, a conveyor provided with a plurality of normally open holders, supporting and driving means therefor comprising a driving sprocket mounted on said sub-frame above the wings of said furrow opener, a pulley on said axle and a second pulley mounted in an elevated position above said main frame, whereby said conveyor has a horizontal reach substantially parallel with the surface of the ground and alined with said furrow opener and a substantially vertical downward reach, a pair of spaced angled holder closing members disposed at the sides of the path of the holders with their angled portions between the wings of said furrow opener, their vertical portions extending upwardly above said main frame, and their horizontal portions terminating adjacent to but in advance of the vertical plane of said furrow closing wheel axle, and press wheels oscillatingly mounted on said sub-frame at the rear of said furrow closing wheels.

4. In a machine of the class described, the combination of a main carrying frame, a sub-frame pivotally mounted at its forward end on said main frame, guide members on said main frame coacting with the rear end of said sub-frame to support it laterally while permitting vertical movement thereof, adjustable means for limiting the downward movement of the rear end of said sub-frame, a furrow opener provided with spaced wings mounted on said sub-frame, furrow closing wheels provided with an axle disposed on said sub-frame at the rear of the furrow opener, a conveyor provided with a plurality of normally open holders, supporting and driving means therefor comprising a driving sprocket mounted on said sub-frame above the wings of said furrow opener, a pulley on said axle and a second pulley mounted in an elevated position above said main frame whereby said conveyor has a horizontal reach substantially parallel with the surface of the ground and alined with said furrow opener and a substantially vertical downward reach, and holder closing members disposed at the sides of the path of travel of said holders and adapted to close the same and retain in closed position, said closing members having vertical portions projecting upwardly from the furrow opener and horizontal portions projecting rearwardly from the furrow opener and terminating adjacent to but in advance of the vertical plane of said furrow closing wheel axle.

5. In a machine of the class described, the combination of a main carrying frame, a sub-frame mounted on said main frame, a furrow opener provided with spaced wings mounted on said sub-frame, furrow closing wheels provided with an axle disposed on said sub-frame at the rear of the furrow opener, a conveyor provided with a plurality of normally open holders, supporting and driving means therefor comprising a driving sprocket mounted on said sub-frame above the wings of said furrow opener, a pulley on said axle and a second pulley mounted in an elevated position above said main frame whereby said conveyor has a horizontal reach substantially parallel with the surface of the ground and alined with said furrow opener and a substantially vertical downward reach, and holder closing members disposed at the sides of the path of travel of said holders and adapted to close the same and retain in closed position, said closing members having vertical portions projecting upwardly from the furrow opener and horizontal portions projecting rearwardly from the furrow opener and terminating adjacent to but in advance of the vertical plane of said furrow closing wheel axle.

6. In a machine of the class described, the combination of a main carrying frame, a sub-frame mounted on said main frame, a furrow opener provided with spaced wings mounted on said sub-frame, furrow closing wheels provided with an axle disposed on said sub-frame at the rear of the furrow opener, a conveyor provided with a plurality of normally open holders, supporting and driving means therefor comprising a driving sprocket mounted on said sub-frame above the wings of said furrow opener, a pulley on said axle and a second pulley mounted in an elevated position above said main frame whereby said conveyor has a horizontal reach substantially parallel with the surface of the ground and alined with said furrow opener and a substantially vertical downward reach, holder closing members disposed at the sides of the path of travel of said holders and adapted to close the same and retain in closed position, said closing members having vertical portions projecting upwardly from the furrow opener and horizontal portions projecting rearwardly from the furrow opener and terminating adjacent to but in advance of the vertical plane of said furrow closing wheel axle, and press wheels oscillatingly mounted on said sub-frame at the rear of said furrow closing wheels, said press wheels having conical inner portions and cylindrical outer portions, the axes of said press wheels being disposed so that their conical portions are in approximately horizontal position at the point of contact with the ground.

7. In a machine of the class described, the combination of a main carrying frame, a sub-frame pivotally mounted at its forward end on said main frame, guide members on said main frame coacting with the rear end of said sub-frame to support it laterally while permitting vertical movement thereof, adjustable means for limiting the downward movement of the rear end of said sub-frame, a furrow opener provided with spaced wings adjustably mounted at its forward end on said sub-frame, furrow closing means disposed on said sub-frame at the rear of the furrow opener, a conveyor provided with a plurality of normally open holders, supporting and driving means therefor disposed so that said conveyor has a downward reach and a horizontal reach substantially parallel with the surface of the ground and alined with said furrow opener, and holder closing members disposed at the sides of the path of travel of said holders and adapted to close and retain the same in closed position to a point adjacent said furrow closing wheels.

8. In a machine of the class described, the combination of a main carrying frame, a sub-frame mounted on said main frame, a furrow opener provided with spaced wings mounted at its forward end on said sub-frame, furrow closing means disposed on said sub-frame at the rear of the furrow opener, a conveyor provided with a plurality of normally open holders, supporting and driving means therefor disposed so that said conveyor has a downward reach and a horizontal reach substantially parallel with the surface of the ground and alined with said furrow opener, and holder closing members disposed at the sides of the path of travel of said holders and adapted to close and retain the same in closed position to a point adjacent said furrow closing wheels.

9. In a machine of the class described, the combination of a main carrying frame, a sub-frame mounted on said main frame, a furrow opener provided with spaced wings mounted at its forward end on said sub-frame, furrow closing means disposed on said sub-frame at the rear of the furrow opener, a conveyor provided with a plurality of normally open holders, supporting and driving means therefor disposed so that said conveyor has a downward reach and a horizontal reach substantially parallel with the surface of the ground and alined with said furrow opener, holder closing members disposed at the sides of the path of travel of said holders and adapted to close and retain the same in closed position to a point adjacent said furrow closing wheels, and press wheels mounted on said sub-frame at the rear of said furrow closing wheels.

10. In a machine of the class described, the combination of a main carrying frame provided with a centrally disposed caster steering wheel, said steering wheel having a peripheral flange constituting a furrowing member, a sub-frame mounted on said main frame for vertical movement independent of said main frame, a furrow opener mounted on said sub-frame to follow in the path of said furrowing member, furrow closing wheels mounted on said sub-frame at the rear of said furrow opener, a conveyor provided with a plurality of normally open holders, supporting and driving means for said conveyor whereby it has a horizontal reach substantially parallel with the surface of the ground and alined with said furrow opener and a downward reach, and holder closing means disposed at the side of the path of the holders, said closing means having horizontal portions alined with the furrow opener and terminating adjacent the vertical plane of the axis of said furrow closing wheels.

11. In a machine of the class described, the combination of a main carrying frame, a sub-frame mounted on said main frame for vertical movement independent of said main frame, a furrow opener mounted on said sub-frame, furrow closing wheels mounted on said sub-frame at the rear of said furrow opener, a conveyor provided with a plurality of normally open holders, supporting and driving means for said conveyor whereby it has a horizontal reach substantially parallel with the surface of the ground and alined with said furrow opener and a downward reach, and holder closing means disposed at the side of the path of the holders, said closing means having horizontal portions alined with the furrow opener and terminating adjacent the vertical plane of the axis of said furrow closing wheels.

12. In a machine of the class described, the combination of a main carrying frame, a sub-frame mounted on said main frame for vertical movement independent of said main frame, a furrow opener mounted on said sub-frame, furrow closing wheels mounted on said sub-frame at the rear of said furrow opener, a conveyor provided with a plurality of normally open holders, supporting and driving means for said conveyor whereby it has a horizontal reach substantially parallel with the surface of the ground and alined with said furrow opener and a downward reach, holder closing means disposed at the side of the path of the holders, said closing means having horizontal portions alined with the furrow opener and terminating adjacent the vertical plane of the axis of said furrow closing wheels, and press wheels mounted on said sub-frame at the rear of said furrow closing wheels, said press wheels having cylindrical outer portions and outwardly tapered inner portions, the axes of the press wheels being disposed at an angle to the horizontal.

13. In a machine of the class described, the combination of a main carrying frame, a sub-frame mounted on said main frame for vertical movement, a furrow opener provided with spaced wings mounted on said sub-frame, furrow closing means disposed on said sub-frame at the rear of the furrow opener, a conveyor provided with a plurality of normally open holders, supporting and driving means therefor comprising a driving sprocket mounted on said sub-frame above said furrow opener and so that the holders are carried between the said wings thereof, and supporting and guiding pulleys positioned so that said conveyor has a horizontal reach substantially parallel with the surface of the ground and alined with said furrow opener and a substantially vertical downward reach, holder closing members disposed at the sides of the path of travel of said holders and adapted to close the same and retain in closed position, said closing members having portions projecting upwardly from between the wings of the furrow opener and horizontal portions projecting rearwardly therefrom and terminating adjacent said furrow closing means, and press wheels oscillatingly mounted on said sub-frame at the rear of said furrow closing means.

14. In a machine of the class described, the combination of a main carrying frame, a sub-frame mounted on said main frame for vertical movement, a furrow opener provided with spaced wings mounted on said sub-frame, furrow closing means disposed on said sub-frame at the rear of the furrow opener, a conveyor provided with a plurality of normally open holders, supporting and driving means therefor comprising a driving sprocket mounted on said sub-frame above said furrow opener and so that the holders are carried between the said wings thereof, and supporting and guiding pulleys positioned so that said conveyor has a horizontal reach substantially parallel with the surface of the ground and alined with said furrow opener and a substantially vertical downward reach, and holder closing members disposed at the sides of the path of travel of said holders and adapted to close the same and retain in closed position, said closing members having portions projecting upwardly from between the wings of the furrow opener and horizontal portions projecting rearwardly therefrom and terminating adjacent said furrow closing means.

15. In a machine of the class described, the combination of a main carrying frame, a sub-frame mounted on said main frame for vertical movement, a furrow opener mounted on said sub-frame, furrow closing means disposed at the rear of the furrow opener, a conveyor provided with a plurality of holders, supporting and driving means therefor comprising a driving sprocket mounted on said sub-frame above said furrow opener and so that the holders are carried into the furrow, and supporting and guiding pulleys positioned so that said conveyor has a horizontal reach substantially parallel with the surface of the ground and alined with said furrow opener, a holder closing means at the sides of the path of travel of said holders adapted to close the same and retain in closed position, said closing means projecting upwardly from said furrow opener and rearwardly therefrom to a point adjacent said furrow closing means, and press wheels oscillatingly mounted on said sub-frame at the rear of said furrow closing means, said press wheels having outwardly tapered inner portions and cylindrical outer portions.

16. In a machine of the class described, the combination of a main carrying frame, a sub-frame mounted on said main frame for vertical movement, a furrow opener mounted on said sub-frame, furrow closing means disposed at the rear of the furrow opener, a conveyor provided with a plurality of holders, supporting and driving means therefor comprising a driving sprocket mounted on said sub-frame above said furrow opener and so that the holders are carried into the furrow, and supporting and guiding pulleys positioned so that said conveyor has a horizontal reach substantially parallel with the surface of the ground and alined with said furrow opener, and a holder closing means at the sides of the path of travel of said holders adapted to close the same and retain in closed position, said closing means projecting upwardly from said furrow opener and rearwardly therefrom to a point adjacent said furrow closing means.

17. In a machine of the class described, the combination of a main carrying frame, a sub-frame mounted on said main frame, a furrow opener carried by said sub-frame, furrow closing means mounted on said sub-frame at the rear of said furrow opener, a conveyor provided with a plurality of normally open holders, supporting and driving means for said conveyor whereby it has a horizontal reach substantially parallel with the surface of the ground and alined with said furrow opener, holder closing means disposed at the side of the path of the holders and having portions alined with the furrow opener and terminating adjacent said furrow closing means, and press wheels mounted on said sub-frame at the rear of said furrow closing means, said press wheels having cylindrical outer portions and outwardly tapered inner portions, the axes of the press wheels being disposed in outwardly inclined relation.

18. In a machine of the class described, the combination of a main carrying frame, a sub-frame mounted on said main frame, a furrow opener carried by said sub-frame, furrow closing means mounted on said sub-frame at the rear of said furrow opener, a conveyor provided with a plurality of normally open holders, supporting and driving means for said conveyor whereby it has a horizontal reach substantially parallel with the surface of the ground and alined with said furrow opener, and holder closing means disposed at the side of the path of the holders and having portions alined with the furrow opener and terminating adjacent said furrow closing means.

19. In a structure of the class described, the combination of a furrow opener, a sprocket chain, a plurality of holders carried thereby and each comprising a base member constituting a link in said chain, a body member having a flange at its inner end mounted on said base member in overlapping relation to adjacent links, said body member having a longitudinal channel in its face and longitudinal openings at each side of said channel adjacent its outer end, an elastic band having its ends disposed through said openings and engaged by retaining pins disposed on the rear side of said body member providing a resilient gripper disposed transversely across said channel adjacent its outer end, a movable jaw having a rearwardly projecting flange at its inner end terminating in a pivot engaging knuckle, a coacting pivot mounted on the rear side of said body member, said jaw having an inwardly projecting flange at its outer end, an elastic band arranged longitudinally around said jaw between its said side flanges providing a yielding gripper and acting to yieldingly hold the jaw in its open position, the outer edge of the opening through which the jaw is arranged constituting a stop limiting the opening movement thereof, a driving sprocket for said chain disposed above the furrow opener so that as the holders are carried around the sprocket they are swung between the wings of said furrow opener, and spaced closing members disposed at the sides of the path of travel of said holders to close their jaws and retain the same in closed position.

20. In a structure of the class described, the combination of a furrow opener, a sprocket chain, a plurality of holders carried thereby and each comprising a base member constituting a link in said chain, a body member mounted on said base member, said body member having a longitudinal channel in its face and longitudinal openings at each side of said channel adjacent its outer end, an elastic band having its ends disposed through said openings and engaged by retaining pins disposed on the rear side of said body member providing a resilient gripper disposed transversely across said channel adjacent its outer end, a movable jaw having a rearwardly projecting flange at its inner end terminating in a pivot engaging knuckle, a coacting pivot mounted on the rear side of said body member, said jaw having an inwardly projecting flange at its outer end, an elastic band arranged longitudinally around said jaw between its said side flanges providing a yielding gripper and acting to yieldingly hold the jaw in its open position, the outer edge of the opening through which the jaw is arranged constituting a stop limiting the opening movement thereof, a driving sprocket for said chain disposed above the furrow opener so that as the holders are carried around the sprocket they are swung between the wings of said furrow opener, and spaced closing members disposed at the sides of the path of travel of said holders to close their jaws and retain the same in closed position.

21. In a structure of the class described, the combination of a furrow opener having diverging wings, a sprocket chain, a plurality of holders carried thereby and each comprising a base member constituting a link in said chain, a body member mounted on said base member, said body member having a longitudinal channel in its face and longitudinal openings at each side of said channel adjacent its outer end, an elastic band having its ends disposed through said openings and engaged by retaining pins disposed on the rear side of said body providing a resilient gripper disposed transversely across said channel adjacent its outer end, a movable jaw having a rearwardly projecting flange at its inner end terminating in a pivot engaging knuckle, a coacting pivot mounted on the rear side of said body member, said jaw having an inwardly projecting flange at its outer end, an elastic band arranged longitudinally around said jaw between its said side flanges providing a yielding gripper and acting to yieldingly hold the jaw in its open position, the outer edge of the opening through which the jaw is arranged constituting a stop limiting the opening movement thereof, a driving sprocket for said chain disposed above the furrow opener so that as the holders are carried around the sprocket they are swung between the wings of said furrow opener, and spaced closing members disposed at the sides of the path of travel of said holders to close their jaws and retain the same in closed position, said holder members extending between said furrow opener wings and rearwardly therefrom.

22. In a structure of the class described, the combination of a furrow opener having diverging wings, a sprocket chain, a plurality of holders carried thereby and each comprising a base member constituting a link in said chain, a body member mounted on said base member and having a longitudinal channel in its face, an elastic gripper disposed transversely across said channel, a movable jaw having a rearwardly projecting flange at its inner end disposed through said body member at one side of said channel, a pivot engaging said flange, said jaw having an inwardly projecting flange at its outer end, a yielding gripper extending between said flanges in opposed relation to said gripper on said body member and acting to yieldingly hold the jaw in its open position, a driving sprocket for said chain disposed above the furrow opener, and a jaw closing means disposed at the side of the path of travel of the holders to successively close the jaws and retain them in closed position for a predetermined period.

In witness whereof I have hereunto set my hand.

SIMON W. VOLLINK.